W. A. LIGHTHALL.

Condensers.

No. 6,067. Reissued Sept. 29, 1874.

Witnesses

J. P. Fitch

B. S. Clark

Inventor

Wm A Lighthall

THE GRAPHIC CO. PHOTO-LITH. 39 & 41 PARK PLACE, N.Y.

UNITED STATES PATENT OFFICE.

WILLIAM A. LIGHTHALL, OF NEW YORK, N. Y.

IMPROVEMENT IN CONDENSERS.

Specification forming part of Letters Patent No. 33,950, dated December 17, 1861; reissue No. 1,878, dated February 21, 1865; reissue No. 6,067, dated September 29, 1874; application filed July 20, 1874.

*To all whom it may concern:*

Be it known that I, WILLIAM A. LIGHTHALL, of the city, county, and State of New York, have invented a certain new and useful Method of Setting Tubes in Tubular Condensers, Heaters, and Refrigerators; and I do hereby declare that the following is a full and exact description of the same, reference being had to the accompanying drawings, and to the letters of reference marked thereon, in which—

Figure 1:
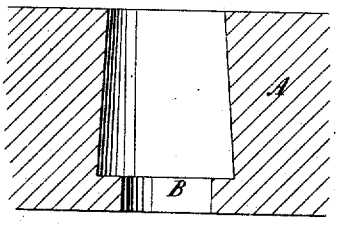
Figure 2:
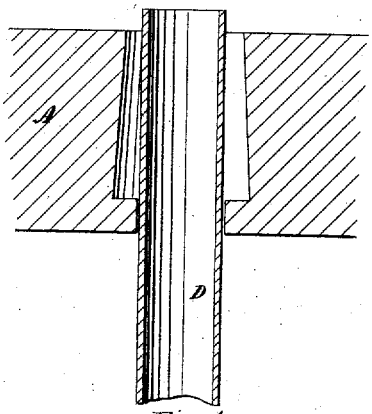
Figure 3:
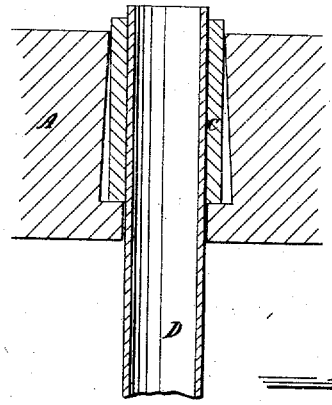
Figure 4:
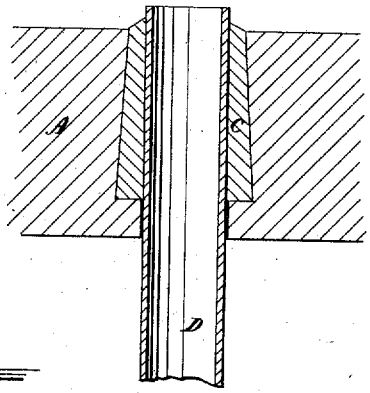
Figure 5:
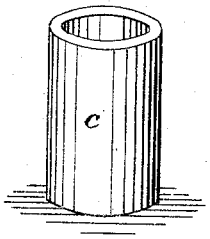

Figure 1 is a sectional (broken) view of a head-sheet, taken through the center of the aperture to receive the tube. Fig. 2 is a similar view, showing the tube put in place to be "set." Fig. 3 is a similar view, showing the packing placed over the tube and in the aperture. Fig. 4 is a similar view, showing the packing "swaged" down to place to secure and "set" the tube. Fig. 5 is a perspective view of the packing.

It is requisite in tubular condensers for condensing the steam exhausted from steam-engines that provision should be made in "setting" the tubes in their tube-sheets for the movement of them due to their expansion and contraction, which is produced by the intermission of the exhaust, which occurs twice to each stroke of the engine, and which, therefore, produces two expansions and contractions of the tubes at each of said strokes, the tubes being expanded by the transmission to them of the caloric of the steam brought in contact with them, and contracted (after the steam is condensed) by that caloric being abstracted from them by the current of cooling water passing through or around them, as the case may be. If the tubes are secured firmly at both ends in their head-sheets (after the manner of setting boiler-tubes) their expansion and contraction either causes them to leak in their setting or to bend and break them, in either event rendering them valueless for the purpose for which they are designed.

The method of setting tubes in tubular condensers has been to permit one or both ends of the tubes to move in a packing made of some suitable material, secured by "followers," or other analogous device, screwed into the tube-head around the tubes, which compacts the packing, and is designed to hold it in place, while the tubes move back and forth with it as they expand and contract. The use of the follower for the purpose indicated is objectionable, both on account of great cost and the constant care required to keep them in contact with and pressed upon the packing, in order that the packing shall properly perform its office.

By my new method of setting these tubes, the follower and all analogous devices are dispensed with altogether. It consists in forming a packing around the unfastened ends of the tubes of some suitable material, such as soft metal, wood, prepared paper, or a combination of these materials, and securing the said packing in place in the head-sheet by the formation of the packing-apertures in the said sheet, as hereinafter described, whereby the packing remains in place and a tight joint is formed without the use of a follower, while the tube, as it expands or contracts, is allowed to move in it.

A is a broken section of a head-sheet, made of cast-iron or other cast metal or composition; the apertures B, for the reception of the tubes, being enlarged at their outer end for about two-thirds of their depth, to form a space to receive the packing hereinafter described. The enlarged portion of the aperture is made slightly larger in diameter (say, one thirty-second of an inch) at the bottom than at the top, so as to hold the packing securely in place, as shown in the drawing. This packing C may be a hollow cylinder of an interior diameter equal to that of the exterior diameter of the tube D, and of an exterior diameter equal to that of the outer end of the aperture B, so as to fill the space between the tube and the aperture, as shown in Fig. 3, and of a length enough greater than the enlarged portion of the aperture B to allow it to be set down by a proper tool, so as to be swaged out to fill up the whole of the space between the tube and the aperture, and to be pressed tightly against the exterior of the tube, as shown in Fig. 4, so that it cannot move from its position when the end of the tube is moved by the expansion and contraction before described, while it allows the tube to move freely within it and yet be preserved tight. This packing, which may be made of soft metal, wood, or paper, or other suitable material, when firmly secured, as shown and described, preserves the ends of the tubes perfectly tight in the head-sheet so far as regards leakage around and past the ends of the tubes, and yet allows them to move to the extent required by their expansion and contraction, as before stated, without the interposition or use of a follower or other analogous mechanical device to hold them in place.

It will be apparent to practical men that my improvement is equally applicable to securing the tubes of condensers to be employed for condensing the steam evaporated from salt-water to be distilled for making potable water, and of those tubular heaters for heating cold water, and of tubular refrigerators for cooling warm water, to preserve them from the effect of the sudden expansion and contraction to which they may be subjected when in use.

What I claim as my improvement, and desire to secure by Letters Patent, is—

The combination of the tubes D, the packing C, and the aperture B in the head-sheet, said aperture being made to fit closely around the tubes for a portion of the thickness of the said sheet, and being enlarged for the remainder of said thickness, to form the conical or tapering recess to receive the said packing, all as described, whereby a steam-tight but movable joint is formed without the use of a follower, as specified.

Witness my hand this 14th day of July, 1874.

WM. A. LIGHTHALL.

Witnesses:
I. P. FITCH,
B. S. CLARK.